(12) United States Patent
Riefe et al.

(10) Patent No.: US 6,598,393 B2
(45) Date of Patent: Jul. 29, 2003

(54) ANTI-THEFT STEERING LOCK

(75) Inventors: Richard Kremer Riefe, Saginaw, MI (US); Ray Garnet Armstrong, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/046,102

(22) Filed: Nov. 1, 2001

(65) Prior Publication Data

US 2003/0079469 A1 May 1, 2003

(51) Int. Cl.$^7$ .......................... F15B 13/01; F15B 20/00; B60R 25/02
(52) U.S. Cl. .......................................... 60/399; 180/287
(58) Field of Search ............................. 60/399; 91/444; 180/287

(56) References Cited

U.S. PATENT DOCUMENTS 4,402,339 A * 9/1983 Owens ........................ 60/494
4,765,362 A * 8/1988 Baruch ........................ 137/385

* cited by examiner

*Primary Examiner*—F. Daniel Lopez
(74) *Attorney, Agent, or Firm*—Edmund P. Anderson

(57) ABSTRACT

A system for steering the wheels of a vehicle. The system includes a steering gear provided with a steering rack reciprocable in a power cylinder. A steering shaft has a pinion meshing with the steering rack. A hydraulic fluid system assists the reciprocation of the steering rack. The hydraulic fluid system includes a power piston reciprocable in the power cylinder. A control valve directs hydraulic fluid from a pump to the power cylinder at one side or the other of the piston, depending on the direction of rotation of the steering shaft. A lock valve is operable when closed to lock the rack against reciprocation to prevent steering of the wheels by preventing fluid flow in the hydraulic fluid system. The lock valve is controlled by a solenoid-operated electronic controller.

4 Claims, 3 Drawing Sheets

ANTI-THEFT STEERING LOCK

These and other objects, features and advantages of the invention will become more apparent as the following description proceeds, especially when considered with the accompanying drawings.

DETAILED DESCRIPTION OF THE PREFERRED EMBODIMENT

Figure 1:
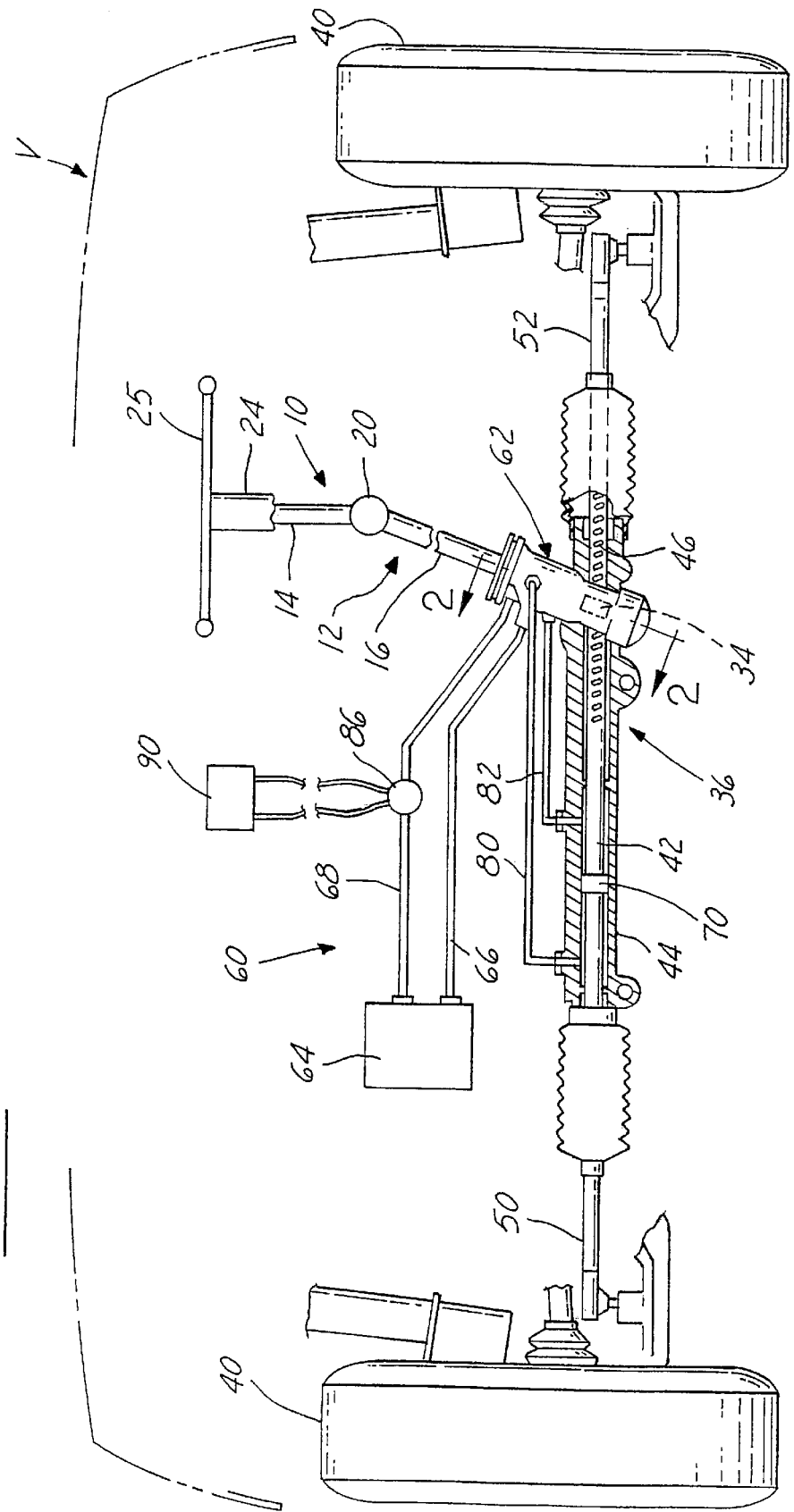
FIG. 1 is an elevational view, with parts in section, of a steering gear for an automotive vehicle, including a hydraulic fluid system for assisting in the operation of the steering gear, and further including a lock valve for preventing fluid flow in the hydraulic system to thereby lock the steering gear in position, constructed in accordance with this invention.
Figure 2:
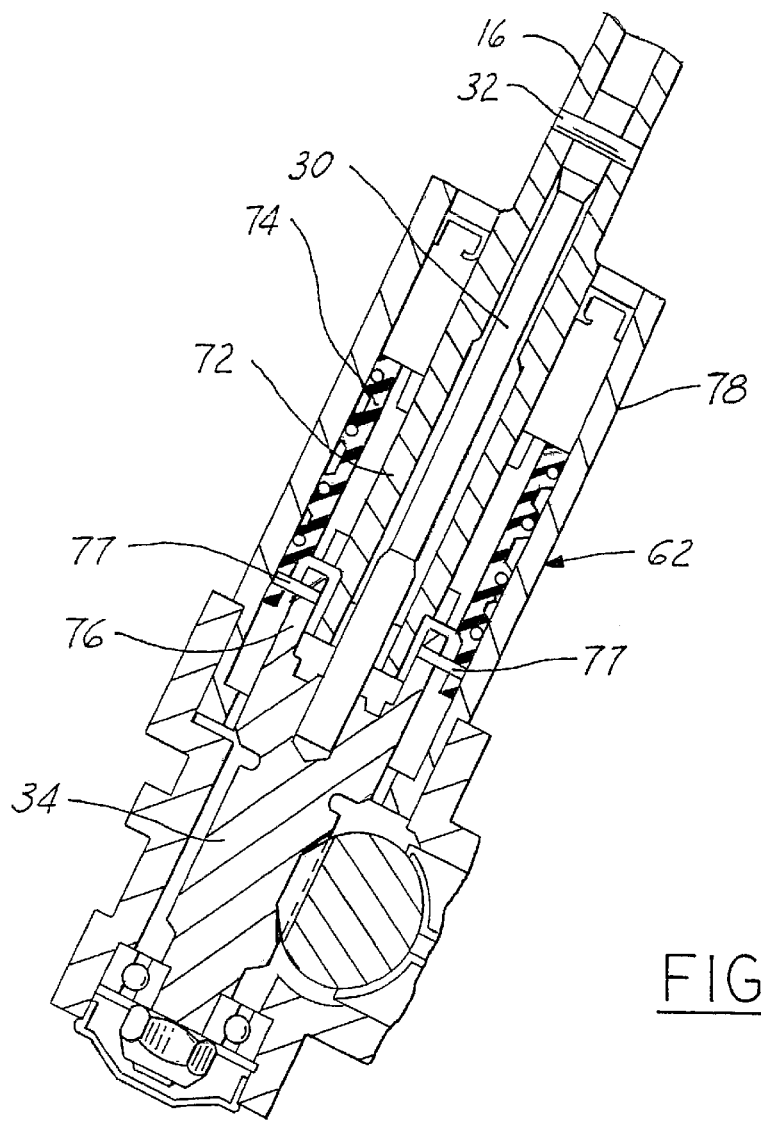
FIG. 2 is a sectional view showing a control valve forming part of the hydraulic system, taken on the line 2—2 in FIG. 1.

Referring now more particularly to the drawings, there is shown a steering column 10 for an automotive vehicle V. A rotatable steering shaft 12 includes steering shaft sections 14 and 16 connected end-to-end by a universal joint 20. The upper steering shaft section 14 is mounted for rotation in a tubular steering column tube or jacket 24. A steering wheel 25 is mounted on the upper end of the steering shaft section 14. The lower steering shaft section 16 has an elongated torsion bar 30. The upper end of the torsion bar 30 is secured to the steering shaft section 16 at 32 and a pinion 34 is secured to the lower end of the torsion bar.

A steering gear 36 is provided for turning the laterally spaced front wheels 40 of the vehicle. The steering gear 36 includes an elongated rack 42 which extends transversely of the vehicle and is mounted in an elongated power cylinder 44 for longitudinal or lengthwise sliding movement. The rack 42 has rack teeth 46 along its length engaged by the pinion 34 so that the rack will be moved longitudinally in one direction or the other depending on the direction of rotation of the steering shaft 12. The ends of the rack 42 are pivoted to tie-rods 50 and 52 respectively connected to the wheels 40 so that longitudinal movement of the rack results in turning of the wheels.

A hydraulic fluid system 60 is provided to assist in moving the rack 42 longitudinally, thereby reducing the manual effort required to turn the steering shaft 12. The hydraulic system includes a control valve 62, a hydraulic fluid pump 64, a pressure conduit 66 for supplying hydraulic fluid from the pump to the control valve, and a return conduit 68 for returning hydraulic fluid from the control valve to the pump. A power piston 70 is secured to the rack 42 and moves with the rack in the power cylinder 44.

The lower shaft section 16 of the steering shaft 12 extends into the control valve 62 and its lower end is tubular and is formed to define a rotatable spool 72 of the control valve. The control valve 62 also includes an outer valve body 74 which is secured to an extension 76 of the pinion 34 by pins 77. The valve body 74 is supported for rotation in the casing 78 of control valve.

A fluid line 80 extends from the control valve 62 to the power cylinder 44 at one side of the power piston 70. A second fluid line 82 extends from the control valve 62 to the power cylinder 44 at the other side of the power piston 70.

Figure 3:
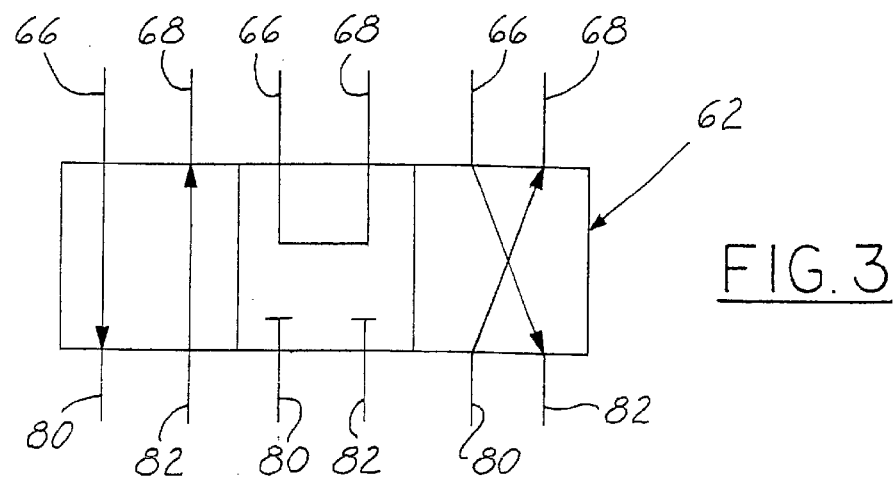
FIG. 3 is a diagrammatic view showing three positions of the control valve.

The control valve 62 has three positions diagrammatically shown in FIG. 3. The center position is neutral in which hydraulic fluid exiting the pump 64 through the pressure conduit 66 is returned to the pump through the return conduit 68, without pressurizing the power cylinder 44 at one side of the piston 70 or the other.

To turn the vehicle wheels 40, the steering shaft 12 is rotated one way or the other by the steering wheel 25, causing the torsion bar 30 to rotate the pinion 34 and the pinion to move rack 42 and, through the tie rods 50 and 52, turn the vehicle wheels. The manual effort required to turn the steering wheel 25 is assisted by the hydraulic power system 60. When the steering shaft 12 is rotated, the valve body 74 is rotated a similar distance. The upper end of the torsion bar 30 is rotated with the steering shaft 12, but is twisted because of the frictional resistance of the vehicle wheels 40 to turning due to contact with the road, so that the lower end of the torsion bar, and the pinion 34 lag slightly. Hence, the valve spool 72 which is connected to the pinion 34, does not turn as much as the valve body 74. This differential rotation of the valve spool 72 and valve body 74 causes the control valve 62 to assume either the right hand position or the left hand position in FIG. 3 to deliver pressure fluid to one side of the piston 70 or the other depending upon the direction of steering shaft rotation, at the same time returning hydraulic fluid from the opposite side of the piston to the pump. In this way, the hydraulic fluid system reduces the manual effort required to make a turn.

A shut-off or lock valve 86 is provided in the return conduit 68. The lock valve 86 is normally open to allow the normal operation of the steering gear. However, by closing the lock valve 86 and preventing fluid flow in the return conduit 68, the power piston 70, and hence the rack 42, cannot move. This effectively locks the steering gear 36 in place, making it impossible to steer the vehicle. In most cases, the vehicle cannot be stolen when the vehicle wheels are locked in one position.

The lock valve 86 may be controlled by a solenoid-operated electronic controller 90 accessible to the driver.

Figure 4:
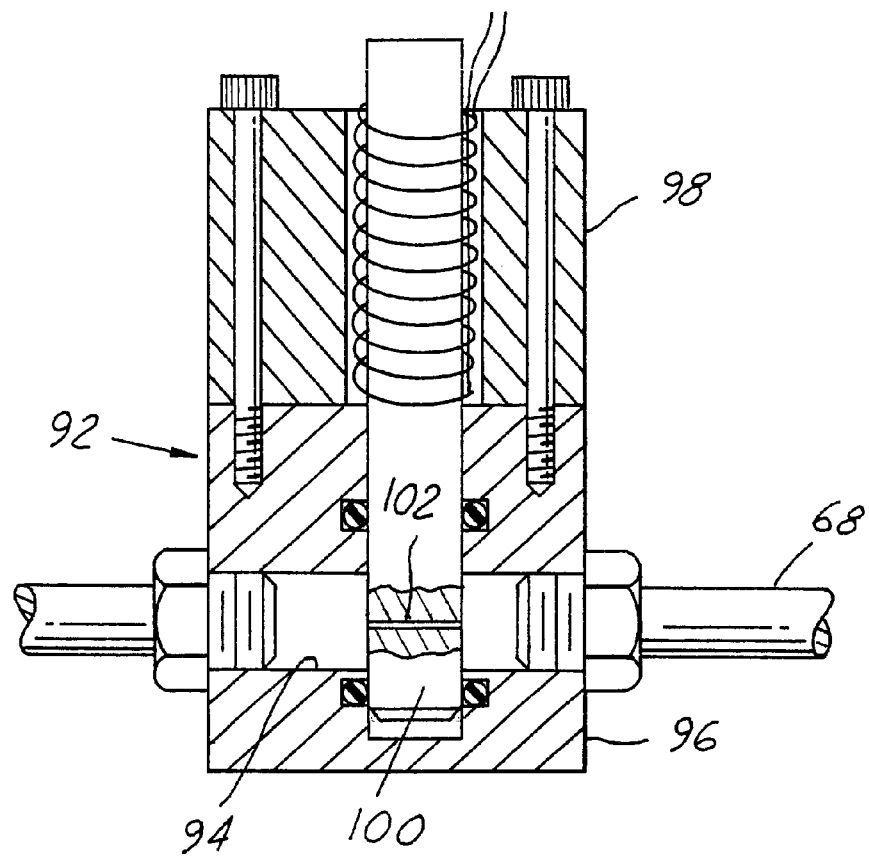
FIG. 4 is a fragmentary sectional view of an alternative lock valve construction.

The lock valve 86 completely prevents the flow of hydraulic fluid when closed so that the rack cannot move. Alternatively, a lock valve may be constructed as shown at 92 in FIG. 4, to allow a small, predetermined, metered flow of hydraulic fluid when closed. Hydraulic fluid in conduit 68 flows through a passage 94 in the body 96 of the lock valve 92 when the lock valve is open. The lock valve 92 is controlled by an electronic controller in the form of a solenoid 98 having a stem 100 which is projected into the body 96 of the lock valve 92 across the chamber 94 to a closed position when the solenoid is activated. The valve stem 100 has a small through passage or metering orifice 102 so that when projected to the closed position shown in FIG. 4, hydraulic fluid in the conduit 68 can flow but only very slowly. Flow in the conduit 68 thus is substantially, but not completely, shut off. This allows the power piston 70 and hence the rack 42 to move, but only very slowly, preventing effective steering and making it extremely difficult for someone to steal the vehicle. Steering is not completely prevented, but can be accomplished only with great effort. Permitting a small amount of fluid flow when the lock valve is closed limits the amount of torque that can be applied on the steering shaft, thereby reducing the strength requirements as well as the cost of manufacturing the steering shaft components.

What is claimed is:

1. A steering system for a road vehicle, comprising:

a steering gear including a reciprocable steering rack connectable to steerable wheels of the vehicle to turn the wheels right upon reciprocation of the rack in a first direction and to turn the wheels left upon reciprocation of the rack in a second direction;

a rotatable steering shaft having a pinion engaging said rack for manually reciprocating said rack in said first and second directions upon rotation of said steering shaft;

a hydraulic fluid system for assisting the steering shaft in the reciprocation of said rack;

said hydraulic fluid system including a power piston reciprocable in a power cylinder and connected to said rack, a hydraulic fluid pump;

a control valve;

a pressure conduit and a return conduit extending from said hydraulic fluid pump to said control valve;

said control valve being operable by the steering shaft to direct hydraulic fluid from the pump through the pressure conduit to the power cylinder at one side or the other of the piston, depending on the direction of rotation of the steering shaft, and to return hydraulic fluid from the power cylinder at the opposite side of the piston through the return conduit to the pump;

a lock valve communicating with at least one of said conduits for selectively closing such conduit to prevent fluid flow in said hydraulic fluid system to releasably lock said rack against movement to prevent steering of the wheels; and wherein said lock valve when closed permits only a relatively small, metered flow of fluid so that steering of the wheel is not completely prevented but is accomplished only with great effort.

2. The steering system of claim 1, wherein said lock valve is operative for opening and closing said one conduit to fluid flow.

3. The steering system of claim 1, wherein said lock valve is disposed in said return conduit for opening and closing said return conduit to fluid flow.

4. The steering system of claim 3, further including a controller operative for opening and closing said lock valve.

* * * * *